April 15, 1952 — L. L. HERCIK — 2,593,144
ALLIGATOR SHEAR BLADE MOUNTING
Filed Aug. 14, 1947 — 2 SHEETS—SHEET 2

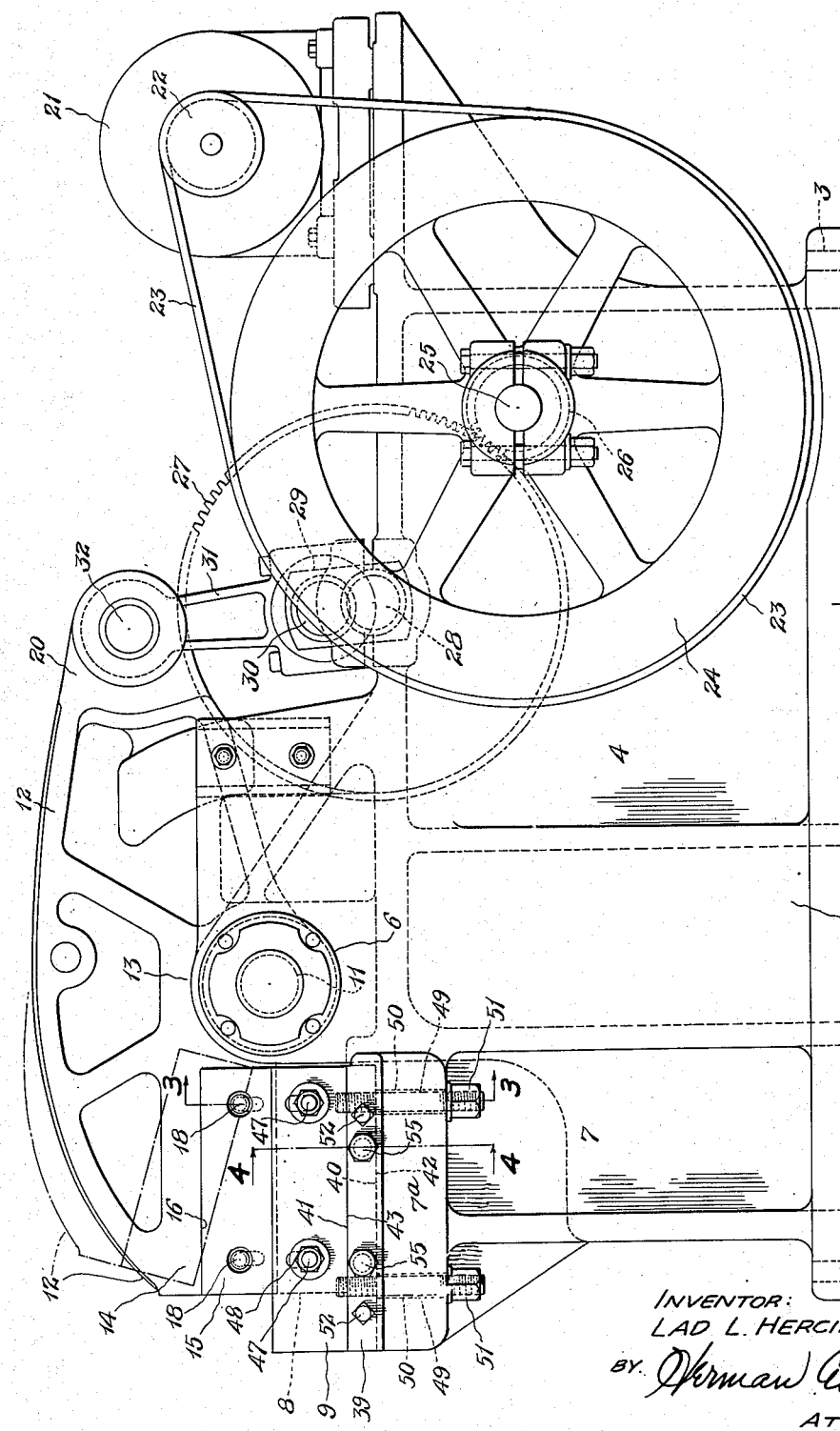

INVENTOR:
LAD L. HERCIK
BY Herman Eisele
ATTORNEY.

Patented Apr. 15, 1952

2,593,144

UNITED STATES PATENT OFFICE 2,593,144

ALLIGATOR SHEAR BLADE MOUNTING

Lad L. Hercik, Lakewood, Ohio

Application August 14, 1947, Serial No. 768,657

5 Claims. (Cl. 164—58)

This invention relates to machinery for shearing metals and particularly to open throated lever type shearing machines of the class generally known as alligator shears.

Machines of this type are used in steel mills, forge shops, scrap yards, and other places, for shearing rails, bars, structural shapes, and miscellaneous fabricated and dismantled scrap materials. These machines are usually made with a very heavy elongated bed provided, intermediate its ends, with a king pin upon which a heavy rocking lever arm is mounted. This lever arm which forms one jaw of the shearing mechanism, is fitted, at its forward end, with a shear blade adapted to cooperate with a similar blade mounted at the forward end of the bed which forms the other jaw of the shearing mechanism. The rear end of the lever arm is connected with power mechanism of any convenient type, for oscillating or actuating the lever arm to rock about the king pin as a pivot, thus moving the shear blade on the lever arm into shearing engagement with the blade on the bed.

The present invention is directed to improvements associated with the shear blades of a shearing machine of the type above referred to, and particularly with the mounting of the lower shear blade on the bed of the machine.

In machines of this type, as heretofore built, a normally stationary shear blade has been mounted on a support integral with the bed and forwardly of the king pin and cooperating with a shear blade mounted on the adjacent face of the lever arm in a manner substantially as shown in my United States Patent No. 2,370,311, issued February 27, 1945. The cutting edges of the shear blades of this type, as will be understood, must necessarily be parallel and must have a predetermined clearance therebetween, depending upon the material to be cut in the shear, not only when the blades are initially installed but as the blades and machine parts wear.

In order to obtain and maintain the necessary parallelism and clearance between the blades, it has heretofore been necessary to put shims behind either the lower or the upper shear blade, as illustrated in Fig. 3 of the patent referred to above. As will be understood, it is extremely difficult to find exactly the proper thickness of shims to produce the desired clearance because of the spring and loose play in the machine parts. Frequently the procuring and trial of several shims has been necessary before the desired thickness of shims has been obtained. As is well known, a greater clearance should be provided for cutting heavy pieces than for lighter sections, and in order to secure the best results, frequent changes of shims became necessary.

In a machine of this type in which the parts sheared consist of metal of various shapes and thicknesses and various degrees of hardness, the wear on the shear blades is unavoidably extremely severe, and frequent re-grinding of the sides of the shear blades becomes necessary. It will also be understood that, after re-grinding, a new shim or set of shims must be provided for insertion behind the shear blades and that, in general, the use of shims is unsatisfactory, uncertain and time consuming.

It is accordingly a prime object of this invention to produce a shear blade mounting which will eliminate the need for the use of shims for effecting the lateral adjustment of shear blades.

It is a further object of this invention to provide a quick method of adjusting the shear blade without the insertion of elements into or withdrawal of elements from the machine and by the use of simple hand tools.

It is a further and more direct object of this invention to provide in an alligator shear, a block of special conformation adapted, on the one hand, to receive a shear blade and, on the other hand, to adjustably engage a base on which it is mounted.

It is a further and more specific object of this invention to provide screw means for laterally adjusting this block and firmly locking this block in the desired adjusted position on its supporting base.

It is a further and more specific object of this invention to embody, in the adjustment of this block, not only means for lateral adjustment but means for limited angular adjustment whereby the cutting edge of the blade supported by the block, may be disposed at a slight angular relation to the longitudinal axis of the alligator shear.

It is a further and more specific object of this invention to so form this block and support that, in adjustment, no openings are formed which can be filled with dirt, scale or other foreign matter, likely to interfere with the correct and easy adjustment of the blade in any desired direction.

A further understanding of the construction and operation and of the manner in which the novel features of this invention effect the above and further objects, will be acquired from the following detailed description and the annexed drawings, which set forth certain means embodying this invention, such disclosed means constituting, however, but one of the forms in which the principle of this invention may be applied.

Referring to the annexed drawings:

Fig. 1 is a right side elevation of an alligator shear embodying this invention, the shear being shown in the closed position in full lines, and the open position of the forward end of the lever arm being shown fragmentarily in dot and dash lines.

Figure 3:
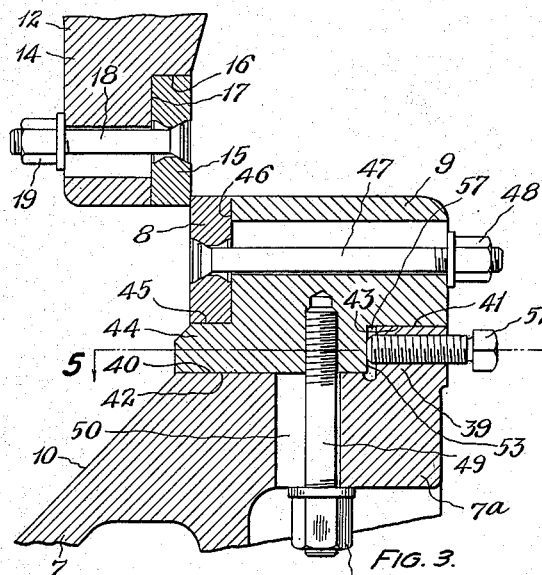
Fig. 3 is an enlarged transverse sectional view thru the shearing blades and blade mounting of the shear shown in Fig. 1, this view being taken on the plane indicated by line 3, 3 in Fig. 1.

This application is a continuation-in-part of my application, Serial Number 643,085, filed January 24, 1946, now matured into Letters Patent 2,440,799, issued May 4, 1948, for Alligator Shear Control Apparatus.

The alligator shear illustrated for the purpose of disclosing the present invention is elongated in its general conformation and is provided intermediate its ends with pivot mechanism including a king pin upon which a lever arm is rocked or oscillated about a horizontal transverse axis, the shearing mechanism being located at the front end of the machine, and suitable power mechanism being provided at the rear end of the machine for the purpose of oscillating or rocking the lever arm about the pivot mechanism. Machines of this type are illustrated and described in my prior Patents Nos. 2,370,311 and 2,440,799 hereinbefore referred to, and in my co-pending application, Serial No. 71,065, filed January 15, 1949, entitled Crank Driving Mechanisms, and reference may be had to these patents and application for disclosures of constructions not directly concerned with the present invention and not fully described herein.

In the following description, when the words "forwardly" or "rearwardly" are used, they are intended to indicate positions respectively in front of or to the rear of the axis of the king pin. When the terms "laterally inwardly" or "laterally outwardly" are used, these terms are understood to indicate positions toward or away from a longitudinal plane coincident with the cutting plane of the alligator shear. Likewise the term "longitudinal" is intended to indicate a direction in, or parallel to, the cutting plane of the alligator shear, and "transversely" is intended to indicate a direction at right angles to the cutting plane of the shear.

The main frame of this improved alligator shear comprises a preferably elongated bed indicated at 1. This bed is of hollow ribbed construction and is formed with a flanged base portion 2 adapted to rest on a suitable permanent foundation or portable support depending upon the size of the shear and the purpose for which the shear is to be used. For purposes of securing the shear structure to the foundation, or support, suitable openings 3 are provided to accommodate bolts or other connecting means.

Integrally formed with the base portion is a side wall structure 4 of box-like conformation which extends in the embodiment disclosed, for substantially more than one half of the length of the bed. Adjacent the forward end and preferably integrally formed with the side wall structure 4, are a pair of bosses 5 and 6 transversely spaced, the boss 5 being located at the left side of the machine as viewed in Fig. 2, and the boss 6 being located at the right side of the machine.

Figure 2:
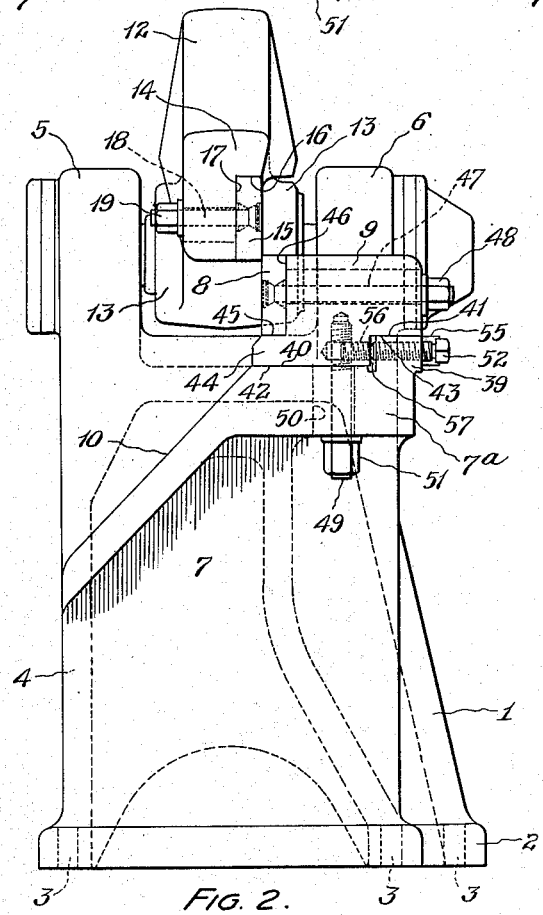
Fig. 2 is a front elevation of the alligator shear shown in Fig. 1, this view being taken from a position facing the jaws at the shearing end of the machine.

Formed at the front of the bed is a frame section 7, extending upwardly from the flanged base 2 and forwardly of the bosses 5 and 6, and having an upper portion 7a disposed, in the embodiment disclosed, on the right side of the frame as viewed in Fig. 2. This portion 7a serves as a support for a normally stationary shear knife or shear blade 8 and for an adjustable blade holder or block 9 in which the shear blade 8 is mounted and to which it is fixed, all of which will be hereinafter more fully described.

The section 7 and the portion 7a of the bed are supported by integrally formed vertical ribs positioned to effectively resist the shear thrust. The upper left wall of the portion 7 is formed with an inclined surface, indicated at 10, adapted to laterally deflect that part which has been cut from the piece being sheared.

The bosses 5 and 6 are formed with bores axially alined with each other in a direction transverse to the length of the shear bed, and oscillatorily mounted in these bores is a king pin 11, preferably of the type fully disclosed and claimed in my Patent No. 2,370,311 above referred to. A shearing arm or lever arm 12, formed with a hub 13 intermediate its ends is fixedly mounted upon the king pin 11. This lever arm 12 extends both forwardly and rearwardly of the axis of the king pin 11 and is necessarily of heavy construction in order that the lever may resist the heavy stresses imposed thereon. The lever arm 12 is preferably of hollow or I beam cross section in order that unnecessary weight may be eliminated. A forwardly extending portion 14 of the lever arm 12 serves as a support for an oscillatable shear blade 15. In order to accommodate this shear blade, a machined seat is formed in the portion 14, said seat comprising a generally horizontal face 16 and a vertical face 17. The blade 15 is firmly secured in place and fixed to the portion 14 by means of a plurality of bolts 18, two in the embodiment disclosed, formed with conical heads seated in conical recesses in the sides of the blade 15, and provided with nuts 19 adapted to firmly hold the blade 15 against the vertical face 17. Conical seats are formed in both sides of the blade 15 and these are positioned in a plane median between the top and bottom of the blade, in order to adapt the blade to be reversed and inverted, and thus to make it possible to place all four cutting edges into cutting position, before it becomes necessary to regrind the blade. The lever arm 12 is formed immediately above the blade 15 with clearance for the parts which are being sheared off.

The lever arm 12 is oscillated in a manner to raise and lower its forwardly extending portion 14 from a closed position to a raised or open position. This oscillation or rocking of the lever takes places about the axis of the king pin 11 and may be effected by any suitable mechanism which is power actuated and associated with the rear end 20 of the lever arm. One satisfactory type of this lever actuating mechanism is disclosed in Fig. 1. Since this mechanism forms no part of this invention per se, it may be described in general terms only. Referring to Figure 1, 21 indicates an electric motor supported on a bracket extending upwardly from the side walls of the bed 1. Upon the shaft of this motor is mounted a V belt pulley 22 driving a plurality of laterally spaced V belts 23, these belts engaging the periphery of a flywheel 24. This flywheel is mounted on a counter shaft 25 rotatably supported in suitable bearings in the bed 1. Mounted on this shaft 25 are one or more pinions 26 engaging one or more gears 27 which are, in turn, mounted on a crankshaft 28. This crankshaft is also mounted in suitable bearings in the bed 1 and is formed, preferably intermediate its ends and substantially in line with the longitudinal median plane thru the lever arm 12, with a crank pin 30 and one or more crank arms 29. This crank pin is in turn operatively connected with the lower end of a pitman or connecting rod 31 which in turn has pivoted connection with a wrist pin 32 mounted in the rear end 20 of the lever arm 12.

It will be evident that the motor 21 is adapted to rotate the crank shaft 28, which in turn oscillates the lever arm 12. It will be understood that the lever actuating mechanism may be run continuously causing the lever arm 12 to oscillate continuously and the shear blade 15 to move up and down with regular strokes; or the lever actuating mechanism may be provided with control mechanism such as disclosed and claimed in my co-pending patent application Serial No. 643,085 which issued as Letters Patent 2,440,799 on May 4, 1948, whereby the lever arm and hence the shear blade may be stopped after each stroke or at any position in the stroke at the will of the operator.

Figure 4:
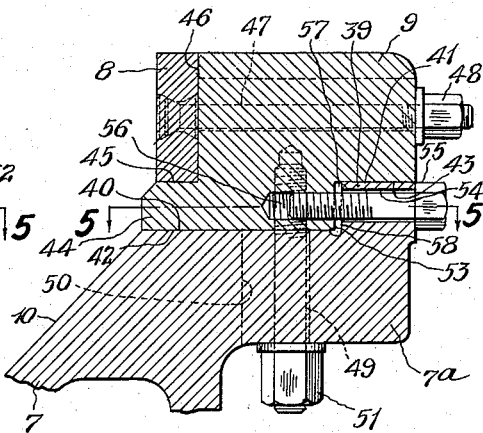
Fig. 4 is a similarly enlarged vertical transverse sectional view of the shear shown in Fig. 1, this section showing the construction of the shear blade and mounting on the plane indicated by line 4, 4 in Fig. 1, this view showing, however, only the normally stationary or lower shear blade and support.
Figure 5:
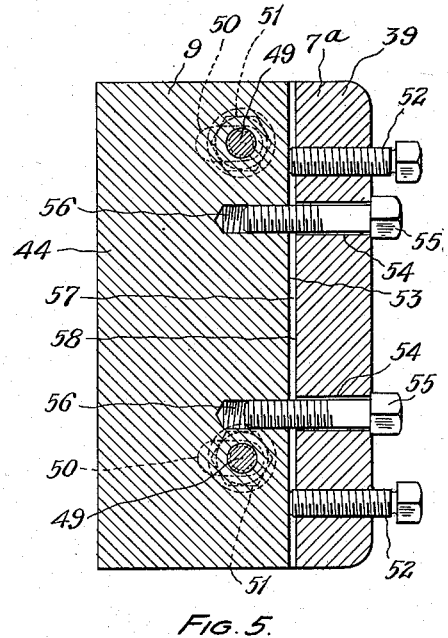
Fig. 5 is a similarly enlarged horizontal sectional view thru the shear blade mounting, this view being taken on the plane indicated by line 5, 5 in Figures 3 and 4.

I refer now more specifically to the details of construction of the normally stationary shear blade 8 and its adjustable holder or block 9, most clearly shown in Figures 3, 4 and 5. As will appear from these figures, the block supporting forwardly extending frame portion 7a is formed on its upper face with a seat or bearing surface 40. The portion 7a is also formed with an upwardly extending projection 39, forming at its upper face a second seat or bearing surface 41 parallel to and positioned in a plane above the seat 40 and outwardly thereof, that is, in a direction away from the longitudinal cutting plane of the alligator shear.

The adjustable block 9 is formed at its lower and inner face with a seat or bearing surface 42, and is formed with a second seat or bearing surface 43 parallel to but vertically spaced above the seat 42. The vertical offset between the seats 42 and 43 on the adjustable block 9 is identical with the offset between the seats 40 and 41 on the supporting frame portion 7a, to the end that the seats 40 and 42 and 41 and 43 will be in intimate contact respectively, in any position in which these respective surfaces are in superimposed relation.

The adjustable holder or block 9 is further provided with an inwardly extending ledge 44 formed above a portion of the seat 42 and is formed at its upper end with a horizontal surface 45 adapted to provide a seat for the bottom of the normally stationary shear blade 8. As will appear, the lateral width of the seat 45 is substantially the same as the maximum width of the blade 8 used in the alligator shear. The holder or block 9 is further formed with a vertical surface 46 preferably square with the seat 45 positioned laterally outwardly from the inner edge of the seat 45 a distance equal substantially to the width of the blade 8. This vertical surface forms a lateral seat for the blade 8 and resists the lateral thrust imposed on the blade 8 incident to the shearing operation. As will appear, the blade 8 is firmly fixed to and held in position against the seat 46 by means of a plurality of bolts 47 formed with conical heads seated in conical openings formed in the side of the blade. Nuts 48 are provided for drawing the conical heads and the blade 8 into tight seating engagement with the block 9. As in the case of the movable shear blade 15, the conical openings are provided in both inner and outer faces of the blade 8 and centrally between the top and bottom edges of the blade so as to permit the inverting of the blade 8 and turning it end for end so that all four cutting edges may be placed into cutting position before it becomes necessary to remove the blade for re-grinding. The shear blades 8 and 15 are preferably duplicates for the sake of interchangeability.

After adjustment and during operation of the shear, the adjustable block is held downwardly against the surfaces 40 and 41 by means of a plurality of studs 49 passing thru transversely elongated slots 50 in the bed portion 7a and drawn down by means of nuts 51.

As clearly shown in Figures 3 and 5, a plurality of set screws 52 pass transversely thru the upwardly extending projection 39 and engage an outwardly facing vertical surface 53 formed on the lower side of the adjusting block between the surfaces 42 and 43 and preferably square with these surfaces. As will appear from Figures 4 and 5, the upwardly extending projection 39 is also formed with a plurality of openings 54 thru which pass cap screws 55 and which engage tapped openings 56 in the body of the adjustable block 9, these openings intersecting the surface 53. Also, as shown in Figures 3, 4 and 5, the openings 54 are slightly larger than the diameters of the shanks of the cap screws 55, and the width of the slots 50 is slightly greater than the diameter of the studs 49.

An inspection of Figures 3, 4 and 5 also indicates that normally a slot or open space 57 exists between the vertical surface 53 of the block 9 and the inner face 58 of the vertical projection 39, the space 57 being closed against entry of foreign substances by the extension of the block 9 overlying the surface 43 and other parts of the block 9.

In the adjustment of the blade holder or adjustable block 9, the following procedure is observed: The lever arm 12 is rocked to a position in which the blade 15 is in the down or closed position, and the nuts 51 and the screws 52 and 55 engaging the adjustable block 9 and its associated blade 8, are slacked off so that the block is free and movable on the seats 40 and 41 on the portion 7a. Under these circumstances the shear blade 8 is preferably firmly maintained in clamped in position on the block 9 by means of the bolts 47. The block is then moved inwardly toward the blade 15 by turning the set screws 52 until the desired clearance exists between the blades 8 and 15. The cap screws 55 are then tightened first for the purpose of preventing the adjustable block from moving inwardly and secondly for the purpose of frictionally locking the set screws 52 in their tapped openings so that they will not rattle loose in operation. When the cap screws are thus fully tightened, the nuts 51 are turned to draw the studs 49 and the adjustable block 9 firmly down against the faces 40 and 41 at the top of the block supporting bed extension 7a.

It frequently happens that subsequent to the static adjustment, a slight further laterally inward adjustment of the blade 8 appears desirable when the alligator shear is operated, either because of loose play or spring of parts under load. Such further adjustment is quickly effected without any dismantling, by simply loosening the nuts 51 and slackening the cap screws 55 the desired slight amount, tightening the set screws 52 against the tension of the cap screws and tightening the nuts 51. A laterally outward adjustment may be made in similar expeditious manner by turning the screws 52 and 55 in the opposite directions.

As a result of progressive wear, either in the machine or in the shear blades, the cutting edges of the blades frequently get out of line or out of parallelism with each other. In alligator shears, as heretofore made, the correction of this condition required the provision of wedge shaped blades or wedge shaped shims behind the blades, either of which are expensive and difficult to produce. With the present construction it is easily possible to overcome this misalignment by advancing one end or the other end of the shear blade 8 further toward the shear blade 15 by use of the screw means outlined. This angular corrective adjustment involves a slight angular tilting of the block 9 with respect to the cutting plane of the shear, and hence involves a slight angular tilting of the axis of the screws 55 in the openings 54 and a slight shifting of the studs 49 in the slots 50. The tilting of the block 9 is made possible by the fact that the openings and slots referred to are both larger in diameter and wider than the screw elements passing therethru. The support or block 9 and its associated blade, being both laterally and angularly shiftable, may accordingly be said to be adjustable in a plurality of directions with respect to the shear mechanism and with respect to the opposed co-operating blade on the shear arm.

If, as a result of continued wear, the blades require any substantial amount of grinding at their upper and lower faces, shims may be inserted between the blade and the horizontal blade seats on the lever arm and/or on the adjustable block, as will be clear. These shims may be of any suitable available thickness.

It will also be clear that the vertical support afforded by the seat 41 on the projection 39 effectively resists the clockwise thrust incident to the shearing stress, while the studs 49 prevent any upward tilting of the inner end of the block 9 or any upward movement of the blade 8 in operation, either during the downward shearing stroke or during the upward stroke of the shear blade 15. It will be evident that the screw elements disclosed comprise a means for securing an adjustment of micrometer accuracy in the adjustment of the blade.

As will be understood in the disclosed construction, an open space 57 necessarily exists between the block 9 and particularly between the vertical surface 53 of this block and the vertical surface 58 of the upward projection 39. In order vertical surface 53 of this block and the vertical to permit the free adjustment of the block 9 with reference to the projection 39, it is essential that this open space 57 be kept free and clear of scale, slivers of metal, dirt and other foreign materials which are so likely to accumulate in the rough work for which this shear is used, especially when used in the open. It is essential that this space 57 be kept free from foreign matter in the event that the block is to be moved outwardly, and it is to be noted that the outward portion of the block 9 and particularly the part of the block 9 overlying the surface 43 which rides upon the projection serves as a most effective cover for this opening 57.

It will be evident that the adjustable block and associated screw means and supporting surfaces are not limited to use on the stationary jaw of the shear. This adjustable shear blade mounting is equally well adapted for use on the oscillating lever arm where it would have all of the advantages pointed out with reference to the construction described.

It will also be understood that this shear blade mounting may be built either in the right hand construction as shown in the drawing, or an opposite construction depending entirely on the location in which the shear is to be used, the selection of the position on the machine being governed by accessibility and by conditions limiting the feeding to a particular side.

It will also be evident that the herein disclosed shear blade mounting for alligator shears eliminates the need for the use of shims for effecting the lateral adjustment of the shear blades; provides a method of adjusting the blade without the insertion or withdrawal of any machine elements, and by the use of simple hand tools; provides screw means capable of producing a micrometer adjustment of the shear blade, and capable of firmly locking the blade in the desired adjusted position; produces a means for angularly adjusting the shear blade in order to position the cutting edges of the shear blades parallel to each other or slightly out of parallelism as may be desired; produces an adjustable mounting for shear blades in which the varying space between the movable and stationary elements is protected against entry of foreign material likely to interfere with the correct and easy adjustment of the blade; and produces a means for firmly locking a movable shear blade holder on its support to resist the severe stresses incident to the shearing operation.

Many modifications of this invention and its application will naturally occur to those skilled in this art and the present disclosure should therefore be considered typical only, and I desire not to be limited to the exact constructions shown and described.

What I claim is:

1. A device of the character described, comprising: supporting means having a seating surface, and blade carrying means having a seating surface, the latter seating surface being slidable upon the seating surface of said supporting means, one of said means also having a portion projecting angularly from the plane of said seating surfaces, said portion having an offset seating surface engageable with a corresponding offset seating surface on the other of said means; and adjustable elements cooperable with said angular portion and with the other of said means, for adjustably positioning one of said means with respect to the other.

2. A device of the character described, comprising: supporting means and blade carrying means, said means having a first set of engaging bearing surfaces, one of said means also having an angular projection and the other of said means a recess for the reception of said projection, the end of said projection and the adjacent face of said recess forming a second set of bearing surfaces offset from and parallel to said first set of bearing surfaces, said supporting means and said blade carrying means being movable relatively to each other on said sets of bearing surfaces; and adjusting elements for adjusting the position of said blade carrying means with reference to said supporting means.

3. A device of the character described, comprising: supporting means having a bearing surface, and blade carrying means having a surface engaging and movable on said bearing surface, said supporting means having an angular projection extending laterally from said supporting surface, means for moving the blade carrying means relatively to said angular projection, said blade carrying means having an extension adapted to overlie any bearing surface of said supporting means exposed by movement of said blade carrying means thereover in a direction away from said angular projection.

4. A device of the character described comprising supporting means having a seating surface, and a blade carrying means having a seating surface, the latter seating surface being slidable upon the seating surface of said supporting means, said supporting means having an angular portion projecting vertically from its seating surface, said blade carrying means having a vertical wall complementary to a vertical wall of said angular portion, means cooperating with said vertical walls for moving said blade carrying means relatively to said angular projection, and said blade carrying means having a second horizontal seating surface seating upon said angular portion and overlying said complementary vertical walls in all adjusted positions of said blade carrying means.

5. The structure recited in claim 4 in which the means cooperating with said vertical walls comprise set screws threaded through said angular portion and bearing against said vertical wall of said blade carrying means, a set of locking screws extending through said angular portion with clearance and being threaded into said blade carrying means, and a set of fastening screws extending through said supporting means with clearance and being threaded into said blade carrying means.

LAD L. HERCIK.

REFERENCES CITED

The following references are of record in the file of this patent:

UNITED STATES PATENTS

| Number | Name | Date |
|---|---|---|
| 786,592 | Ohl | Apr. 4, 1905 |
| 1,140,897 | Frank | May 25, 1915 |
| 1,334,391 | Nilsson | Mar. 23, 1920 |
| 1,866,855 | Kirsten | July 12, 1932 |